UNITED STATES PATENT OFFICE.

HENRY SPENCER BLACKMORE, OF MOUNT VERNON, NEW YORK, ASSIGNOR TO THE PURE ALUMINIUM AND CHEMICAL COMPANY, OF WEST VIRGINIA.

RETORT AND METHOD OF MAKING SAME.

SPECIFICATION forming part of Letters Patent No. 605,379, dated June 7, 1898.

Application filed June 12, 1896. Renewed April 21, 1898. Serial No. 678,432. (No model.)

*To all whom it may concern:*

Be it known that I, HENRY SPENCER BLACKMORE, a citizen of the United States, and a resident of the city of Mount Vernon, in the county of Westchester and State of New York, have invented a new and useful improvement in retorts for producing carbon bisulfid or other volatile corrosive compounds and in methods of making the same, of which the following is a specification.

The object of my invention is to produce a retort to be employed in the manufacture of carbon bisulfid which will be of such character as to practically be indestructible as regards corrosive action of material produced (carbon bisulfid) and at the same time impervious to it.

The retorts generally employed for the production of carbon bisulfid up to the present time have consisted principally of cast-iron, which, having such a strong affinity for sulfur when heated, were rapidly corroded and destroyed thereby during the production of carbon bisulfid, thus increasing the cost of the product. Porous fire-clay retorts have also been employed, but proved unsatisfactory for the reason that the silica and alumina present in the constituents of the retort, as aluminium silicate, together with other oxids of earth metals were dissociated at red heat by carbon-bisulfid vapor permeating through the pores of retort, producing fusible sulfids of disintegrating character, also contaminating the carbon bisulfid with more or less silicon sulfid, thereby precluding it from use in certain directions where silicon contaminations are injurious. My invention therefore relates to a new form of retort whereby these difficulties are greatly obviated, if not eradicated; and it consists in employing an ordinary fire-clay or gas retort and coating the same on the interior with fusible oxid of lead, then heating it so as to form a glaze, after which it is exposed to the action of carbon-bisulfid vapor when at a red heat, whereby the lead oxid, free or combined with the surface of the retort, is transformed into lead sulfid, which, being in the presence of the porous fire-clay, is absorbed, thereby filling the pores of the retort and making the same impervious to any volatile material that may be thereafter introduced into the same, also forming an enamel or glaze which prevents any further action of carbon bisulfid on the constitutents of the retort and practically preventing the disintegrating and contaminating action experienced hitherto. In course of practical operation should this glaze or enamel of lead sulfid wear off by friction of carbon or charcoal in filling and operating retorts they can be readily reglazed without removal from the furnace by recoating with lead oxid, heating, and again exposing to action of carbon bisulfid, as before, which thus makes them with proper care practically indestructible.

Having now described my invention, what I claim as new, and desire to secure by Letters Patent, is—

1. A retort of refractory material such as fire-clay lined with an enamel or glaze of lead sulfid substantially as described.

2. The method of producing an impervious, non-corrodible retort, for manufacture of carbon bisulfid or similar corrosive material, which consists in exposing the inner surface of a retort of refractory material such as fire-clay to the alternate action of lead oxid and carbon-bisulfid vapor or gas while in a heated state substantially as described.

3. A retort, for the manufacture of volatile corrosive materials such as carbon bisulfid, having a lining or coating of lead sulfid substantially as described.

In testimony that I claim the foregoing as my invention I have signed my name, in presence of two witnesses, this 11th day of June, 1896.

HENRY SPENCER BLACKMORE. [L. S.]

Witnesses:
CHAS. A. SCHENCK,
ALBERT F. GESCHEIDT.